United States Patent Office 2,738,803
Patented Mar. 20, 1956

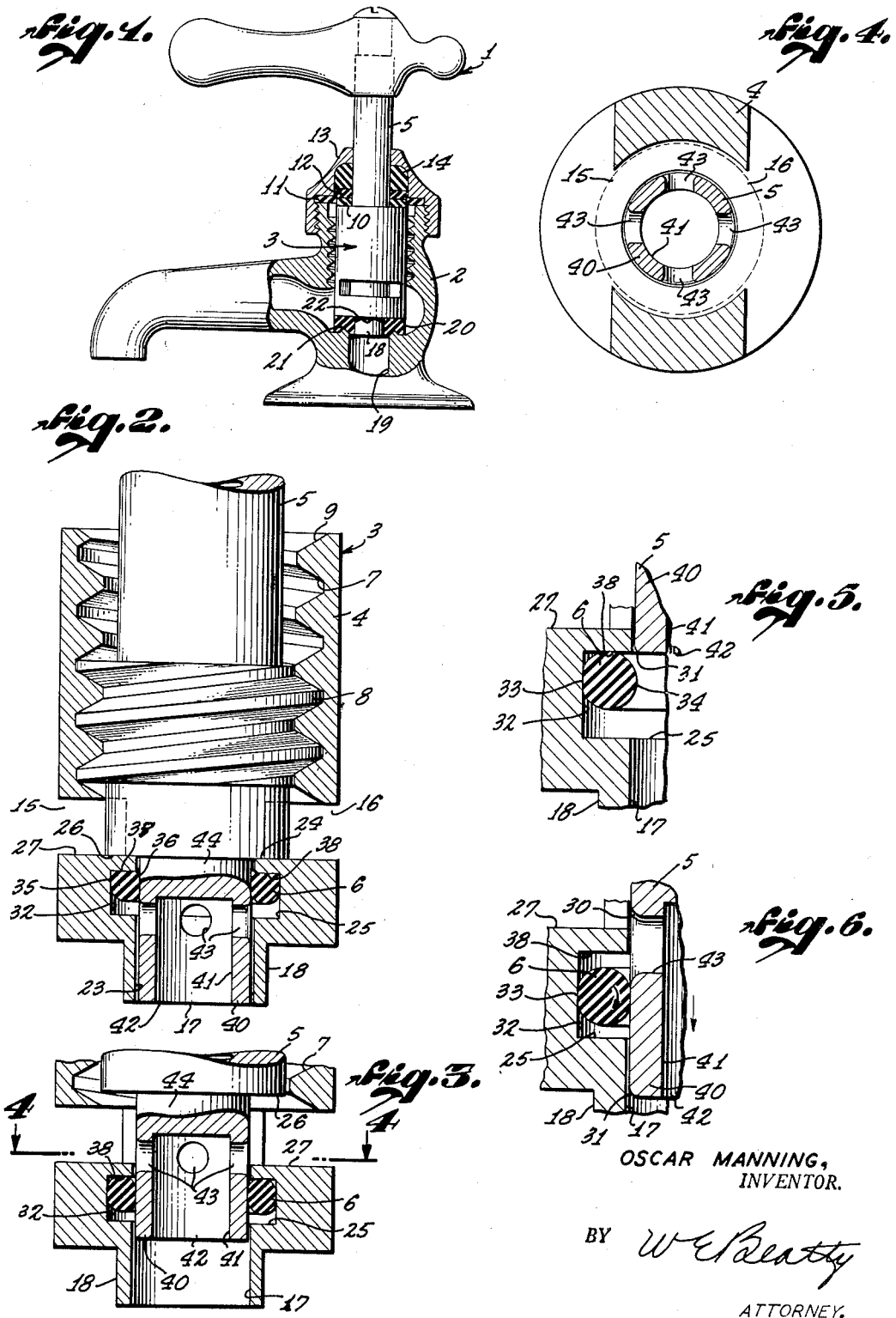

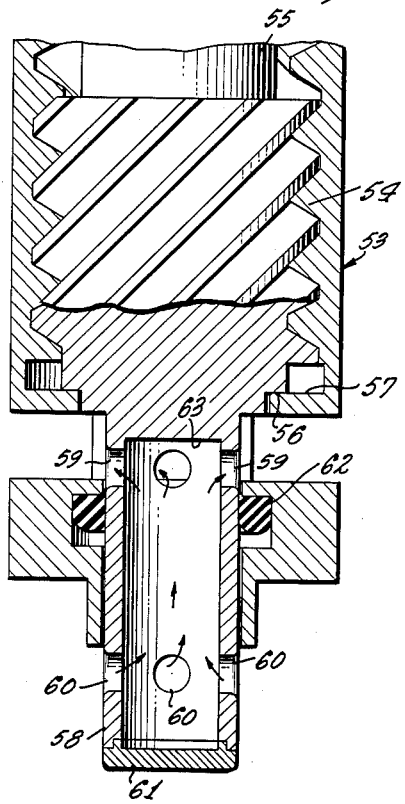
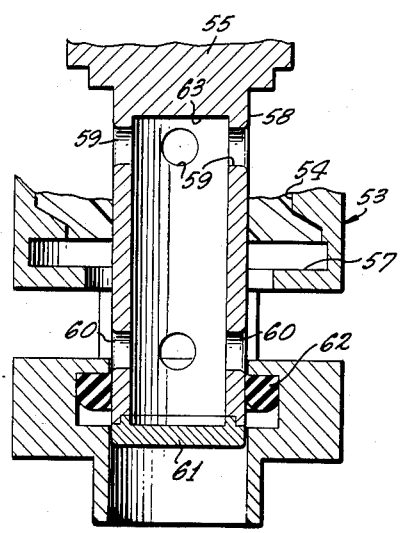
OSCAR MANNING,
INVENTOR.
BY W E Beatty
ATTORNEY.

2,738,803

VALVE

Oscar Manning, Los Angeles, Calif.

Application July 21, 1952, Serial No. 300,100

3 Claims. (Cl. 137—454.6)

The invention relates to a valve and more particularly to improvements in the construction of the valve head and its seat.

The invention relates to improvements in the valve disclosed and claimed in co-pending application Ser. No. 180,545, filed August 21, 1950, Patent 2,726,676, December 13, 1955.

In common with that co-pending application, the present case provides a valve wherein the valve head cannot be damaged if undue force is used to close the valve, as the valve head is sealed by fluid pressure acting on an O-ring, a separate stop being provided to limit the closing movement of the valve. This construction has the advantage that the valve can have a large degree of tolerance, as the space relation of the valve head and the seat may have a large tolerance as the sealing is effected by fluid pressure acting on the O-ring. This provides a construction wherein the O-ring will not blow out of its groove, as the groove is located in the seat member, and the valve head is arranged to fit in the ring for all positions of the valve head.

Also in common with the above mentioned pending application, wear on the O-ring is reduced by minimizing the time during which the fluid pressure is unbalanced on the ring to seal space between the valve head and its seat, it only being necessary to move the valve head for a distance comparable to the thickness of the O-ring, to equalize such pressure. Wear is also reduced by providing for the O-ring a groove which is longer in the direction of movement of the valve head than the diameter of the O-ring, and by providing an O-ring having an outside diameter larger than the diameter of the groove, the O-ring also being wider than the space between the valve head and the opposite wall of the groove, whereby when the valve is opened and fluid pressure substantially balanced on the opposite sides of the O-ring, the initial closing movement of the valve head rolls the ring on its own axis to bring a fresh surface of the ring into position for sealing during the final closing movement of the valve head.

The invention may be applied to a replaceable unit for a faucet or the construction may be embodied in a faucet as originally constructed.

An object of the invention is to provide a valve which will automatically close by fluid pressure.

This is accomplished by employing the above mentioned construction in combination with a support for the valve stem in the form of a screw thread having a very steep pitch, or a sliding, non-rotating fit. The valve head is provided with a piston area which moves the valve head to closed position and holds it there until it is manually or otherwise moved to open position.

For further details of the invention reference may be made to the drawings wherein Fig. 1 is a vertical sectional view of a faucet embodying one form of the present invention as applied to a replacement unit shown in side elevation.

Fig. 2 is an enlarged sectional view of the replacement unit of Fig. 1 with the valve stem broken away and with the valve in closed position.

Fig. 3 is a view corresponding to Fig. 2 with parts broken away showing the valve in open position.

Fig. 4 is a sectional view on line 4—4 of Fig. 3 looking in the direction of the arrows.

Fig. 5 is an enlarged, vertical, sectional view with parts broken away, showing the valve stem removed from the O-ring.

Fig. 6 is a view corresponding to Fig. 5 with the valve stem moved partially towards closed position and illustrating the rolling action on the O-ring.

Fig. 7 is a vertical sectional view of a modification, namely the automatic self-closing valve, showing the valve head in open position.

Fig. 8 is a view corresponding to Fig. 7 with parts broken away showing the valve head in closed position.

Referring in detail to the drawings, the faucet 1 is shown as having a casing 2 having a valve head which has been discarded and replaced by the replacement valve unit 3. The unit 3 comprises three parts, namely, a casing 4, a valve stem 5 and O-ring 6. The casing 4 has a cylindrical exterior of a diameter small enough to fit inside of the faucet casing 2. The casing 4 at its outer end has an internal screw thread 7 which mates with the thread 8 on the stem 5. The outer end of casing 4 has a bevel 9 to receive the sealing ring 10. Other rings indicated at 11 and 12 are placed on ring 10, and in the bonnet 13 is other packing indicated at 14 so as to prevent leakage past the stem 5.

Casing 4, at an intermediate portion thereof at the inner end of the thread 7, has opposed ports 15 and 16, which serve as outlets for fluid entering the inlet 17. The inner end of casing 4 has a reduced neck 18 of smaller diameter than the inlet 19 in the existing faucet. The inner end of casing 4 is sealed against leakage, by means of a sealing ring 20 which fits on the neck 18, and is forced against the existing seat 21 in the faucet, by a shoulder 22 at the outer end of the neck 18.

The inner end of casing 4 has a cylindrical bore 23 of which the inner end serves as an inlet 17, the outer end 24 having a groove 25 for O-ring 6, of rubber or rubber substitute material.

The bore 23 is cylindrical and the groove 25 is annular and opens into bore 23. The groove 25 has a depth slightly less than the diameter of O-ring 6 and the groove 25 has a length substantially greater than the diameter of O-ring 6. The closing movement of valve stem 5 is limited by a shoulder 26 on the stem abutting a shoulder 27 which defines one side of the outlet ports 15 and 16 in the casing 4.

In the form shown in Figs. 1 to 6, the stem 5 terminates at its inner end in a valve head in the form of a sleeve 40 which has a dead-end bore 41, the inner end 42 of which is open and exposed to the inlet. Bore 41 is intersected by one or more ports indicated at 43 which open at their outer ends at the periphery of the sleeve 40.

The valve head 40 forms a support for the inside of the ring 6 when the valve is open, such support as well as the ports 43 cooperating to prevent the ring 6 from blowing out.

The following dimensions of the parts in Figs. 1 to 6 are given by way of example: O. D. of O-ring 6 uncompressed is .375"; I. D. of O-ring 6 uncompressed is .250"; O. D. of valve head 40 is .248", that is, .002" less than I. D. of O-ring 6; O. D. of groove 25 is .361"; the cross-section diameter of O-ring 6 is 1/16".

Preferably the ports like 43 have a diameter which is not greater than the cross-section diameter of the O-ring 6. Also, to reduce or prevent wear, ports 43 are chamfered or rounded at their outlet ends as indicated at 30 and the outer surface of the sleeve 40 is polished, to remove all sharp corners or rough surfaces which might damage the ring 6. For this purpose the inner end of sleeve 40 at its outer surface is also rounded as shown at 31.

When the valve is fully closed, the plug portion 44 extends within the ring 6 and shuts off flow to the outlet ports 15, 16. As the valve head 40 opens, when ports 43 are opposite ring 6, the inlet pressure is by-passed around the ring 6 through the ports 43, to equalize the pressure on ring 6 before the valve head 40 is fully open. When it is fully open, the outer end of sleeve 40 extends inside of ring 6 and supports it and also prevents it from blowing out as the ring cannot leave through the small gap between sleeve 40 and the bore 23.

As shown in Fig. 5, when the valve head 40 is entirely removed from the O-ring 6, the ring 6 at its outside expands against the bottom wall 32 of the groove as shown at 33, while the inside 34 of the ring extends in the path of the outer surface of the valve head 40.

As shown in Fig. 6, after the valve head 40 has been fully opened and then moved to the partially closed position in Fig. 6, the fluid pressure on opposite sides of the ring being substantially the same, the valve head 40 at the start of its closing movement rolls the ring 6 on its own axis to a position somewhat as shown at 33. After the valve head has been closed sufficiently to shut off the fluid pressure at the top of the ring 6, the fluid pressure at the bottom of the ring 6 forces it to the top of groove 25 to form a sealing contact as shown in Fig. 2, against the bottom 32 of the groove as shown at 35, against the valve head 40 as shown at 36, and against the top wall 38 of the groove 25 as shown at 37.

The self-closing valve is shown in Figs. 7 and 8 wherein the casing 53 is similar to casing 4, except that the thread 54 between the valve stem 55 and the casing 53 is given a very steep pitch, for example 45° to 60°. Also the valve stem 55 has a shoulder 56 which abuts against the casing shoulder 57 to limit the opening movement of the valve. In this case, the valve head 58 is a hollow cylinder as before and provided with one or more ports like 59 at one position of its axis and spaced therefrom one or more other ports like 60. The inner end of the valve head 58 is closed by a cap 61. When the valve stem 55 is pushed in by hand or otherwise, the inlet fluid pressure, flowing through the inlet like 19 in Fig. 1 enters the ports like 60, passes through the interior of the valve head 58, thereby by-passing the O-ring 62, the fluid passing out through the ports like 59 to the outlet which may be as shown in Fig. 1. On releasing the downward pressure of the hand or the like on the stem 55, the fluid pressure acts on the cap 61 which acts as a piston head and on the piston head area 63 at the outlet end of the valve head, to automatically raise the valve head to the position shown in Fig. 8, wherein the ports like 60 as well as the ports like 59 are both on the outlet side of the O-ring 62, flow being prevented thereby and by the cap 61. Fluid pressure on cap 61 maintains the valve closed.

Various modifications may be made in the invention without departing from the spirit of the following claims.

I claim:

1. A valve comprising a hollow cylindrical casing of one piece of material, said casing having an outer end having a steep pitch thread bore and a shoulder at the inner end of said bore, said casing having an inner end having a seat member, said casing having a transverse opening providing a port between the inner end of said thread bore and said seat member, said seat member having an internal groove, an O-ring for said groove, said seat member having a bore, a valve stem having threads for said casing threads, a shoulder on said stem, a tubular valve head inwardly projecting from the inner end of said stem and of smaller diameter than the inside diameter of said casing threads, said tubular valve head slidably fitting in said O-ring and in said bore, said valve head having longitudinally spaced ports, said shoulders limiting inward movement of said valve head to a position with one of said ports exposed at the inner end of the bore of said seat and the other of said valve head ports opposite said casing port, said threads supporting said valve stem for movement to a position where both of said ports are inwardly positioned with respect to said ring, said valve head terminating in a closed inlet end acting as a piston, said threads supporting said valve head for automatic closing movement by inlet fluid pressure on said valve head.

2. A valve according to claim 1, said seat member having a reduced inner end having a shoulder adapted to make sealing contact with the inlet of an existing valve casing, said hollow cylindrical casing and associated parts comprising a replacement unit for the existing valve casing.

3. A replacement unit for a faucet, said unit comprising a one piece cylindrical casing having a steep pitch threaded bore and a seat member and a transverse opening providing a port therebetween, and a one piece valve member therefor having steep pitch threads for said casing threads and having a hollow valve head portion having longitudinally spaced ports and a closed inner end, said seat member having an O-ring in which said valve head portion slidably fits, said threads supporting said valve head portion for movement to one position wherein the outer one of its ports is opposite said casing port and the inner of its ports is inwardly of said seat member, and to a second position wherein the inner port of said valve head portion is outwardly disposed with respect to said O-ring, said closed inner end acting as a piston and preventing flow when said valve head is in its said second position.

References Cited in the file of this patent

UNITED STATES PATENTS

| 25,853 | Stickney | Oct. 18, 1859 |
|---|---|---|
| 587,092 | French | July 27, 1897 |
| 1,156,190 | Sweet | Oct. 12, 1915 |
| 1,359,593 | Hardt | Nov. 23, 1920 |
| 1,570,568 | Howell | Jan. 19, 1926 |
| 1,880,615 | White | Oct. 4, 1932 |
| 1,919,856 | McGeorge | July 25, 1933 |
| 2,029,837 | Schmid | Feb. 4, 1936 |
| 2,174,337 | Welsmiller | Sept. 26, 1939 |
| 2,357,139 | Seme | Aug. 29, 1944 |
| 2,360,733 | Smith | Oct. 17, 1944 |
| 2,363,673 | Jensen | Nov. 28, 1944 |
| 2,371,585 | Newell | Mar. 13, 1945 |
| 2,438,642 | Martin | Mar. 30, 1948 |
| 2,442,642 | Eckel | June 1, 1948 |
| 2,515,029 | Almond | July 11, 1950 |

OTHER REFERENCES

Handbook on Synthetic Rubber Packings, E. F. Houghton & Co., Philadelphia, 1st Ed., 1947 (page 71 relied on).